(12) United States Patent
Fukushima et al.

(10) Patent No.: US 6,642,990 B2
(45) Date of Patent: Nov. 4, 2003

(54) LIQUID CRYSTAL DISPLAY ELEMENT WITH THRESHOLDLESS VOLTAGE TRANSMITTANCE CHARACTERISTIC

(75) Inventors: Rieko Fukushima, Yokohama (JP); Tatsuo Saishu, Ota-Ku (JP); Rei Hasegawa, Yokohama (JP); Hajime Yamaguchi, Yokohama (JP); Kohki Takatoh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 110 days.

(21) Appl. No.: 09/948,641

(22) Filed: Sep. 10, 2001

(65) Prior Publication Data

US 2002/0030778 A1 Mar. 14, 2002

(30) Foreign Application Priority Data

Sep. 12, 2000 (JP) ........................................ 2000-276487

(51) Int. Cl.$^7$ ............................ C09K 19/02; G02F 1/141
(52) U.S. Cl. ........................ 349/172; 349/171; 349/134
(58) Field of Search ................................. 349/134, 171, 349/172

(56) References Cited

U.S. PATENT DOCUMENTS

| | | | | |
|---|---|---|---|---|
| 5,099,344 A | * | 3/1992 | Tsuboyama et al. | 349/138 |
| 5,377,028 A | * | 12/1994 | Yoshida et al. | 349/76 |
| 6,046,789 A | * | 4/2000 | Funfschilling et al. | 349/172 |
| 6,091,478 A | * | 7/2000 | Tanaka et al. | 349/184 |
| 6,151,090 A | | 11/2000 | Tanaka et al. | 349/134 |
| 6,175,401 B1 | | 1/2001 | Tanaka et al. | 349/172 |
| 6,417,828 B1 | * | 7/2002 | Sato et al. | 345/89 |
| 2002/0033928 A1 | * | 3/2002 | Choi et al. | 349/171 |

FOREIGN PATENT DOCUMENTS

| | | | |
|---|---|---|---|
| JP | 01-253716 | * | 10/1989 |
| JP | 8-328010 | | 12/1996 |
| JP | 8-328011 | | 12/1996 |
| JP | 8-328016 | | 12/1996 |
| JP | 09-179122 | * | 7/1997 |
| JP | 10-301089 | | 11/1998 |
| JP | 10-301090 | | 11/1998 |
| JP | 10-301148 | | 11/1998 |

* cited by examiner

Primary Examiner—Tarifur R. Chowdhury
(74) Attorney, Agent, or Firm—Oblon, Spivak, McClelland, Maier & Neustadt, P.C.

(57) ABSTRACT

A liquid crystal display element including a first electrode substrate having a first transparent substrate, a first electrode formed on the first substrate, and a first alignment layer formed on the first substrate. The liquid crystal display element further includes a second electrode substrate having a second transparent substrate, a second electrode formed on the second substrate, and a second alignment layer formed on the second substrate. The liquid crystal display element also has a light modulating layer of a smectic liquid crystal material which is sandwiched between the first and second electrode substrates and which has a thresholdless voltage-transmittance characteristic and a spontaneous polarization of 120 nC/cm$^2$ or less. Further, the polarity force component of the surface free energy of each of the first and second alignment layers is 13 dyn/cm or less.

8 Claims, 8 Drawing Sheets

| LIQUID CRYSTAL MATERIAL | Ps [nC/cm²] | TRANSITION TEMPERATURE [°C] | |
|---|---|---|---|
| | | SC*-SA | SA-I |
| a | 38 | 70 | 95 |

| KINDS OF ALIGNMENT LAYER MATERIAL | PRESENCE OF SIDE CHAIN(s) (MAIN CHAIN), NONE, PRESENCE | α [°] 1) | SURFACE FREE ENERGY 2) [dy n/cm] | | | DETERIORATION RATIOS 3) | REMARKS |
|---|---|---|---|---|---|---|---|
| | | | $\gamma_s$ | $\gamma_s^d$ | $\gamma_s^p$ | | |
| A | NONE | 1-2 | 53.4 | 38.9 | 14.5 | 4.2 | |
| B | PRESENCE(A) | 3-4 | 52.9 | 39.0 | 13.9 | 1.9 | |
| B:C=2:1 | PRESENCE(A) | | 52.7 | 38.2 | 14.5 | 1.8 | MIXED ALIGNMENT LAYER |
| B:C=1:2 | PRESENCE(A) | | 50.6 | 38.1 | 12.5 | 1.2 | MIXED ALIGNMENT LAYER |
| C | PRESENCE(A) | 6-9 | 49.0 | 37.5 | 11.5 | | LAYER NORMAL DIRECTION IS NOT DETERMINED AS ONE DIRECTION |
| D | PRESENCE(A) | 90 | 48.5 | 37.9 | 10.6 | | FAN-SHAPED TEXTURE |
| E | NONE | 1-3 | 47.9 | 33.6 | 14.2 | 4.7 | F IS INTRODUCED INTO MAIN CHAIN OF G |
| F | NONE | | 49.9 | 38.1 | 12.0 | 2.0 | POLARITY OF G IS INCREASED |
| G | NONE | 1-2 | 51.4 | 42.1 | 9.0 | 1.7 | |
| G:H=2:1 | PRESENCE(G) | | 50.9 | 42.2 | 8.8 | 1.6 | MIXED ALIGNMENT LAYER |
| G:H=2:1 | PRESENCE(G) | | 50.0 | 41.5 | 8.5 | 1.8 | MIXED ALIGNMENT LAYER |
| H | PRESENCE(G) | 3 | 48.7 | 40.0 | 8.7 | 2.0 | |
| I | — | 1.4 | 50.4 | 39.0 | 11.4 | 2.1 | LOW PRETILT TYPE FOR FLC |
| J | — | 1.7 | 48.6 | 38.4 | 10.3 | 3.0 | LOW PRETILT TYPE FOR FLC |
| K | — | 1.1 | 49.7 | 41.0 | 9.1 | 2.5 | LOW PRETILT TYPE FOR FLC |
| L | — | 1.0 | 47.4 | 43.1 | 4.3 | 1.1 | LOW PRETILT TYPE FOR FLC |
| M | — | 1.3 | 48.3 | 45.4 | 2.9 | 1.4 | LOW PRETILT TYPE FOR FLC |
| N | — | 1.2 | 49.6 | 46.8 | 2.8 | 1.5 | LOW PRETILT TYPE FOR FLC |

FIG. 4

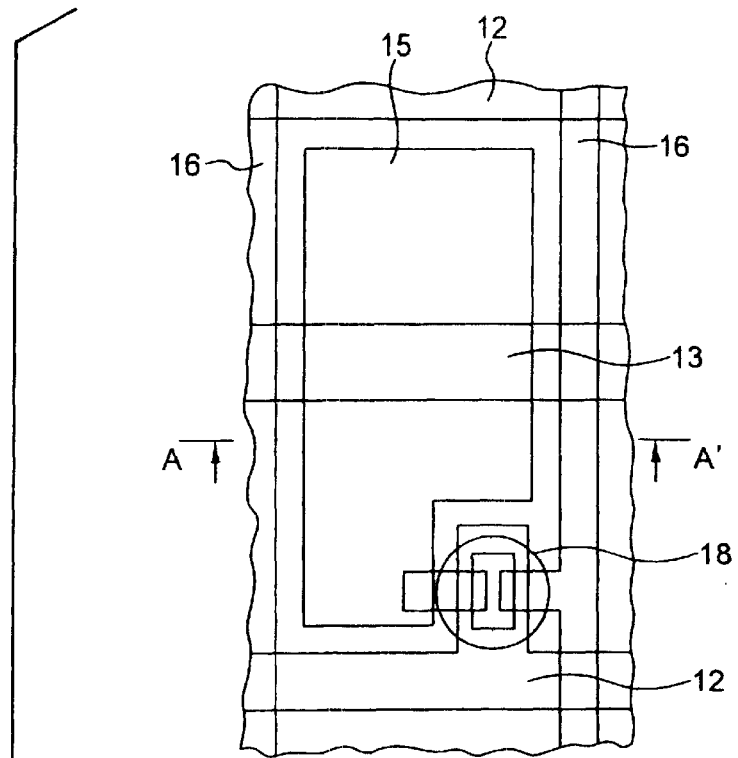
(a)
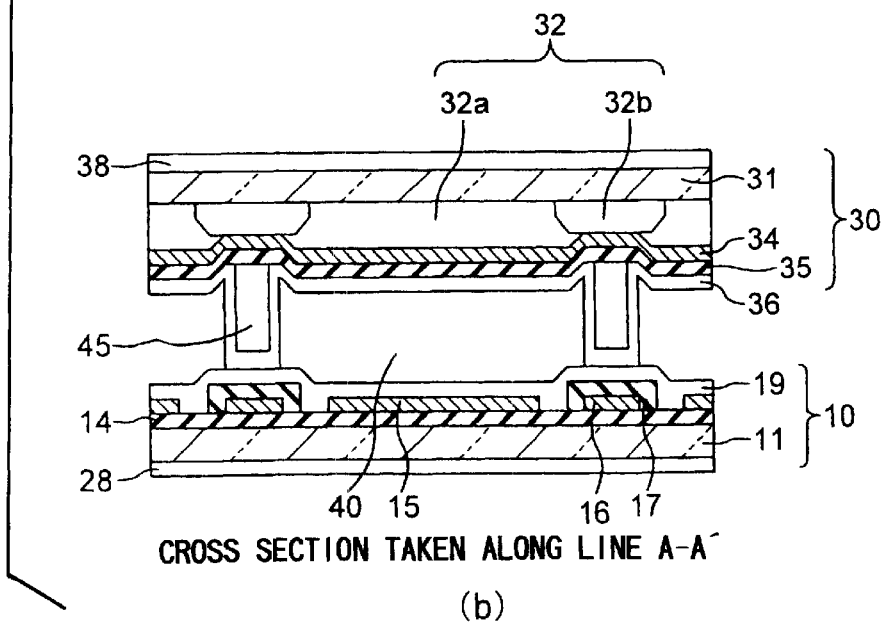
CROSS SECTION TAKEN ALONG LINE A-A'
(b)
F I G. 5

$$(1+\cos\theta)\,\gamma_L = 2\sqrt{(\gamma_S^d \cdot \gamma_L^d)} + 2\sqrt{(\gamma_S^p \cdot \gamma_L^d)}$$

WATER : $\gamma_L = 72.8,\ \gamma_L^d = 29.1,\ \gamma_L^p = 43.7$

METHYLENE IODIDE : $\gamma_L = 50.8,\ \gamma_L^d = 4.0,\ \gamma_L^p = 46.8$ $\gamma_S$ : SOLID SURFACE FREE ENERGY
$\gamma_L$ : LIQUID SURFACE FREE ENERGY
$\gamma_{SL}$ : INTERACTION BETWEEN SOLID AND LIQUID

LIQUID CRYSTAL DISPLAY ELEMENT WITH THRESHOLDLESS VOLTAGE TRANSMITTANCE CHARACTERISTIC

CROSS REFERENCE TO RELATED APPLICATION

This application is based upon and claims benefit of priority from the prior Japanese Patent Application No. 2000-276487, filed on Sep. 12, 2000; the entire contents of which are incorporated herein by reference.

BACKGROUND OF THE INVENTION

1. Field of The Invention

The present invention relates generally to a liquid crystal display element.

2. Description of Related Art

Smectic liquid crystal materials having spontaneous polarization, such as ferroelectric liquid crystals and anti-ferroelectric liquid crystals, are expected as materials of next-generation liquid crystal display elements, since these materials have characteristics, such as rapid response and wide viewing angles, in a surface stabilized display mode. Particularly in recent years, it has been attempted to provide various active matrix liquid crystal displays (AMLCDS) for high quality moving picture. As materials which are suitable for this use and which have no hysteresis, thresholdless anti-ferroelectric liquid crystals (which is also called V-shaped switching liquid crystals and which will be hereinafter referred to as "TLAF liquid crystals"), polymer stabilized ferroelectric liquid crystals (which will be hereinafter referred to as "PS-FLC liquid crystals"), monostable FLCs showing V-shaped switching, and half V-shaped switching FLCs are widely noticed.

However, liquid crystal displays using liquid crystal materials having spontaneous polarization are characterized in that it is more difficult to realize a uniform alignment having no defect than twisted nematic (TN) liquid crystals, since such displays have a layer structure. Moreover, it was found that optical response characteristic, having no hysteresis, of TLAF, monostable FLCs showing V-shaped switching, and half V-shaped switching FLCs are induced by alignment layers. There are some cases where the TLAF phases are not provided by some kinds of alignment layers even if the same liquid crystal material is used. Therefore, in order to use a smectic liquid crystal with optical response characteristics having no hysteresis for a light modulating layer of a liquid crystal display, it is important to elect the optimum alignment layer to ensure sufficient alignment stability.

As a typical example, the TLAF liquid crystal will be described below. In an ideal TLAF liquid crystal, an average optical axis during the application of a voltage of 0 V (which will be hereinafter referred to as an optical axis from layer normal) is coincident with the normal direction of a smectic layer. When the TLAF liquid crystal is used as a light modulating layer of a display element, two polarizing plates, the polarizing axes of which are orthogonal to each other and which have the crossed Nicols configuration, are arranged in front and behind a liquid crystal panel, and the normal direction of the smectic layer is arranged so as to be coincident with one of the polarizing axes. In this case, there is obtained a transmittance-voltage characteristic shown in FIG. 11, wherein black is displayed when a voltage of 0 V is applied and a half tone to white is displayed when a positive or negative voltage is applied. However, in the case of some combinations of liquid crystal materials having a smaller spontaneous polarization than 120 $nC/cm^2$ with alignment layers, there was observed a phenomenon that a domain, which had a stripe shape parallel to the direction of the smectic layer and in which the optical axis was deviated, was produced to grow with the elapse of time and/or that the deviation of the optical axis increased. In addition, in the case of some liquid crystal materials, the same domain in which the optical axis was deviated was produced when a voltage which was higher than or corresponding to a saturation voltage was applied. The deviated angle of the optical axis is narrower than the corn angle ($\theta$). The reason for this is that the apparent tilt angle is narrow since the smectic layer has chevron structure, not bookshelf. This phenomenon that the optical axis is shifted from the normal direction of the layer will be hereinafter referred to as alignment deterioration.

Referring to FIGS. 12(a) through 12(d), examples of observed alignment deterioration will be described below. FIG. 12(a) is a schematic diagram of a smectic layer structure. Alignment layers provided on both substrates are rubbed at predetermined angles, and a TLAF liquid crystal material is introduced between the substrates, so that a smectic layer structure shown in the figure is formed. FIGS. 12(b) and 12(c) are schematic diagrams showing the alignment state when this panel is observed by a microscope wherein polarizing plates are arranged in the crossed Nicols configuration. Furthermore, if one of the polarizing directions of a polarizer and analyzer is shifted from the normal direction of a smectic layer by x° as shown in FIG. 12(d), it is easy to observe the deteriorated domain.

In an alignment wherein no alignment deterioration occurs, the optical axis is one direction as shown in FIG. 12(b), so that light uniformly transmits to be visible. However, in a state that a domain having an optical axis deviated by ±x° is produced, i.e., in a deteriorated alignment, it is observed that a domain having an optical axis coincident with the polarizing direction is dark, and a domain having an optical axis deviated in the opposite direction is bright, in a uniform alignment as shown in FIG. 12(c). In the application to a display element, if it is not possible to completely inhibit this alignment deterioration, light leakage in a dark state is caused to deteriorate contrast.

As measures to inhibit deterioration, Japanese Patent Laid-Open No. 10-319377 has proposed a method for introducing a polymer precursor into a TLAF liquid crystal material, injecting them between substrates, and photopolymerizing them in SA phase to stabilize the structure when a voltage of 0 V is applied.

However, the inventors studied and verified that according to the method for introducing the polymer precursor as disclosed in Japanese Patent Laid-Open No. 10-319377, the alignment of the TLAF liquid crystal is disturbed by foreign molecules other than the liquid crystal material, to increase light leakage in a dark state regardless of polymerization methods, so that contrast lowers.

SUMMARY OF THE INVENTION

It is therefore an object of the present invention to eliminate the aforementioned problems and to provide a liquid crystal display element having a good display performance, which is not influenced by the deterioration with the time course and the history of applied voltage.

In order to accomplish the aforementioned and other objects, according to a first aspect of the present invention, a liquid crystal display element comprises: a first electrode substrate having a first transparent substrate, a first electrode formed on the first substrate, and a first alignment layer formed on the first substrate; a second electrode substrate having a second transparent substrate, a second electrode formed on the second substrate, and a second alignment layer formed on the second substrate; and a light modulating layer of a smectic liquid crystal material which is sandwiched between the first and second electrode substrates and which has a thresholdless voltage-transmittance characteristic and a spontaneous polarization of 120 nC/cm$^2$ or less, the polarity force component of the surface free energy of each of the first and second alignment layers being 13 dyn/cm or less.

Furthermore, the pretilt angle measured by a nematic liquid crystal with respect to the first and second alignment layers is preferably less than 6 degrees.

More preferably, the polarity force component of the surface free energy is 9 dyn/cm or less.

According to a second aspect of the present invention, a liquid crystal display element comprises: a first electrode substrate having a first transparent substrate, a first electrode formed on the first substrate, and a first alignment layer formed on the first substrate; a second electrode substrate having a second transparent substrate, a second electrode formed on the second substrate, and a second alignment layer formed on the second substrate; and a light modulating layer of a smectic liquid crystal material which is sandwiched between the first and second electrode substrates and which has a thresholdless voltage-transmittance characteristic and a spontaneous polarization of 120 nC/cm$^2$ or less, the dispersion force component of the surface free energy of each of the first and second alignment layers being 38 dyn/cm or more.

Furthermore, the pretilt angle measured by a nematic liquid crystal with respect to the first and second alignment layers is preferably less than 6 degrees.

More preferably, the dispersion force component of the surface free energy is 42 dyn/cm or more.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings:

FIG. 4 is a table showing the kinds of alignment films, surface free energies and deterioration ratios;

FIGS. 5(a), 5(b) are schematic diagram showing the construction of an active matrix liquid crystal display (AMLCD) element;

DESCRIPTION OF THE EMBODIMENTS

Before describing the embodiments of the present invention, how the present invention has been made will be described below.

As described in the description of the prior art, it has been revealed that a TLAF liquid crystal has different alignment characteristics in accordance with the kind of an alignment layer.

Figures 2, 3:
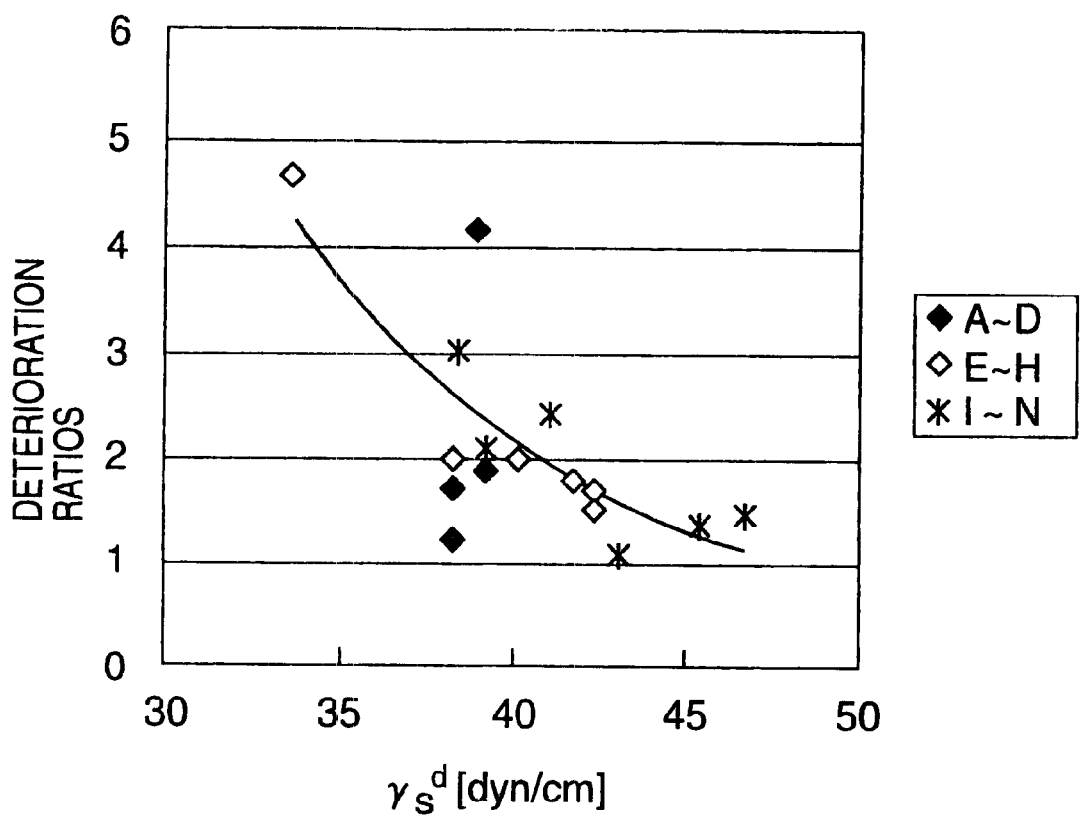
FIG. 2 is a graph showing the dependency of deterioration ratios on the dispersion force components $\gamma s^d$ of surface free energies.
FIG. 3 is a table showing various physical characteristic values of a liquid crystal material for use in the embodiment of the present invention.

Therefore, the inventors studied the following items with respect to combinations of a TLAF liquid crystal material shown in FIG. 3 and alignment layer materials shown in FIG. 4, in order to optimize an alignment layer for a TLAF liquid crystal.

① Pretilt Angle α
② Surface Free Energy γs (Polarity Force Component $\gamma s^P$, Dispersion Force Component $\gamma s^d$)
③ Deterioration Ratio (Comparison of Quantities of Light Leakage between in Initial Alignment and in Alignment After Deterioration)

Typical nematic liquid crystal materials, such as ZLI-2293, ZLI-2003 or ZLI-1565 (Both produced by Merck, Co., Ltd.) were used for measuring the pretilt angle (①). The reason why the pretilt angle has a certain range is that it is slightly varies in accordance with the kind of the nemaic liquid crystal.

Figure 6:
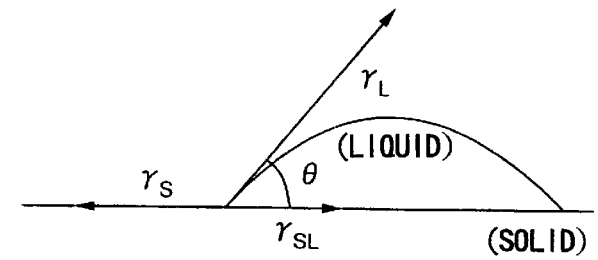
FIG. 6 is an illustration for explaining a contact angle (θ) of a droplet on the surface of a solid and Young's equation.

Young's equation was used for calculating the surface free energy γs (②) from a contact angle θ, which was measured using pure water and methylene iodide, with respect to an alignment layer which was deposited so as to have the same thickness of a panel and for which the same heat process as a panel sealing process for sealing top and bottom substrates constituting the panel was carried out (see FIG. 6). The calculation was carried out in accordance with Owens's method (see D. K. Owens et al., J. Appl. Polym. Sci., 13, 1741 (1969)), and the surface free energy γs is the sum of a polarity force component $\gamma s^P$ and a dispersion force component $\gamma s^d$. The alignment layer materials having only main chain and no side chain are indicated by "None", and the structures having side chains are indicated by "Presence" (see FIG. 4). The proportion of introduced side chains increases toward the bottom of the table.

Figure 7:
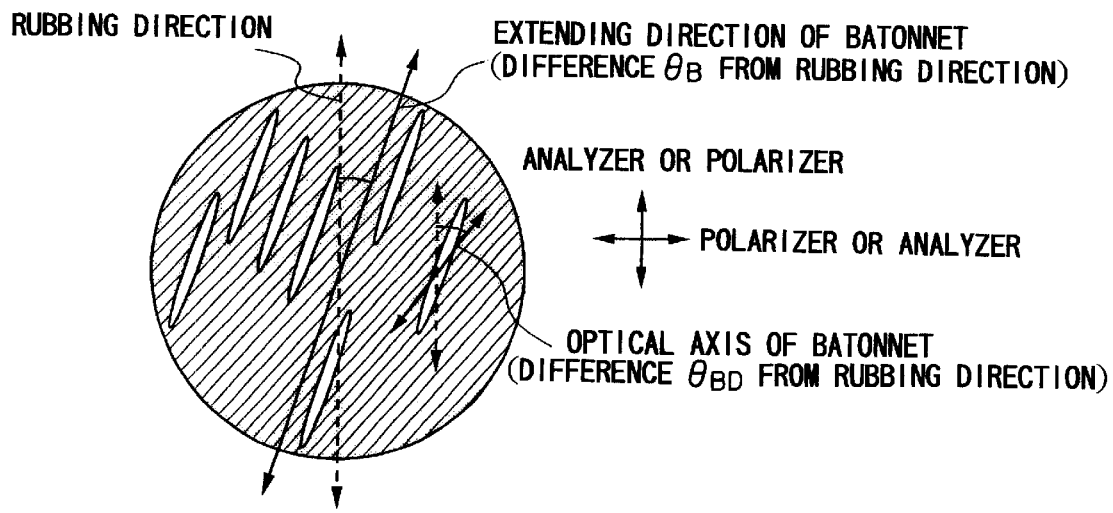
FIG. 7 is an illustration showing the extending direction and optical axis of a batonnet which is observed by a polarizing microscope having the crossed polarizers confiugration.

The deterioration ratio ③ is a value which is obtained by dividing the quantity of light leakage in a dark state after the deterioration of alignment by the quantity of light leakage in a dark state in the initial alignment (see FIG. 4). This deterioration ratio was observed by a panel wherein a substantially parallel rubbing (cross rubbing) process shifted in a direction, in which the shifted angle $\theta_{BD}$ (see FIG. 7) between the rubbing direction and optical axis was canceled, was carried out (FIG. 12(a)). Because it was verified by the inventor's study (described Japanese Patent Application No. 11-369363) that the normal direction of a finally obtained layer structure (a layer structure in SC* phase) was coincident with the optical axis of the batonnet in SA phase. By this cross rubbing, the normal directions induced from both of the alignment layers can be caused to be coincident with each other.

Furthermore, batonnet is a name of SA phase deposited in Iso phase at near an Iso/SA phase transition temperature, and it has been known that the batonnet is deposited from the interface of an alignment layer, to which a force which induce molecule to align parallel to the rubbing direction is applied in a cooling process from Iso phase. Since SA phase having anisotropy is deposited in isotropic Iso phase, if a polarizing microscope having the crossed polarizers configuration is arranged so that the axis of a polarizer or analyzer is shifted from the axis of the uniaxial optical anisotropy (=optical axis) of SA phase, the batonnet can be easily observed because a polarized component which be able to pass through the analyzer is produced so that only light passing through the SA phase portion (batonnet 2), of linearly polarized light having passed through the polarizer. Typically, the batonnet has a rod shape. Here in after, the longitudinal direction of the batonnet is defined as an extending direction (see FIG. 7). If the axis of the uniaxial optical anisotropy is caused to be coincident with one of the polarizing axes of the polarizer, i.e., if the polarizing direction of linearly polarized light is caused to be coincident with the optical axis of the SA phase, the polarized component capable of passing through the analyzer is not produced. For that reason, no batonnet is observed by the microscope. This is the same if the axis of the uniaxial optical anisotropy is caused to be coincident with the polarizing axis of the analyzer. The axis of the uniaxial optical anisotropy of the batonnet is determined as a direction in which no batonnet is observed by a microscope having the crossed polarizers configuration. Throughout the specification, the extending direction and optical axis are defined by an angle shifted from a rubbing direction, and it is assumed that the clockwise angle shifted from the rubbing direction toward the surface of the alignment layer has plus and the counterclockwise angle shifted from the rubbing direction toward the surface of the alignment layer has minus (see FIG. 7).

Figure 12:
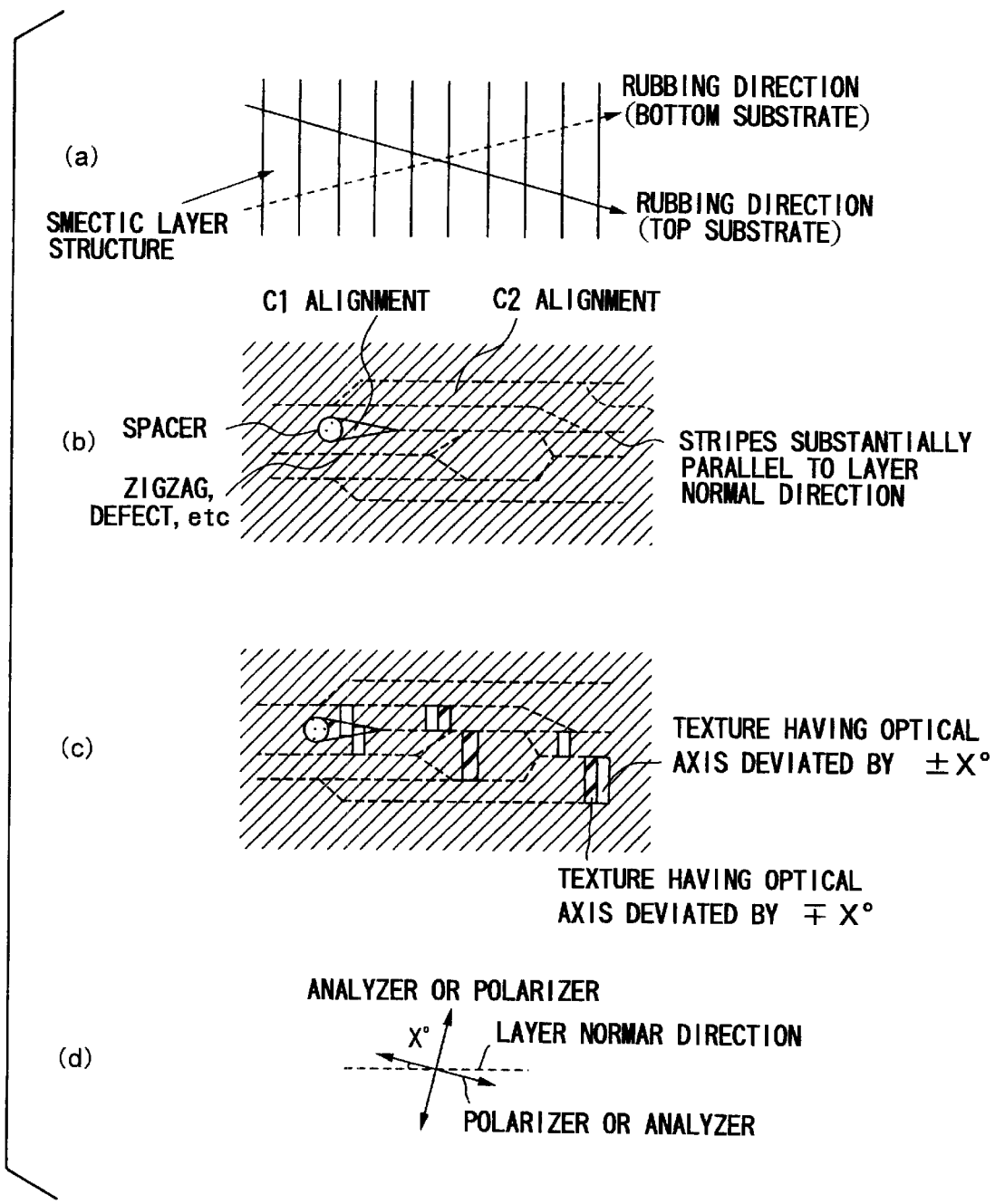
FIGS. 12(a)–(d) are schematic diagram showing the observed results of a smectic layer structure and alignment deterioration.

The shift between the rubbing direction and the optical axis of batonnet varies in accordance with the used liquid crystal material and alignment layer material. FIG. 12($a$) shows an example wherein, in a combination of a liquid crystal material shifted in the plus direction with an alignment layer material, top and bottom substrates are rubbed in a direction in which the shift is canceled to cause layer normal directions induced from both surfaces of the alignment layer to be coincident with each other. In the prior art (Japanese Patent Laid-Open No. 4-371925), the rubbing direction is defined from the deviation of the optical axis from the rubbing direction in a state that the whole surface is SA phase. However, it is known that the axis of optical anisotropy in SA phase depends on temperature (W. Chen et al., Phys. Rev. Lett., 68(19)1547 (1992)). Therefore, in view of the timing in which smectic layers are formed during Iso-SA phase transition and the smectic layers induced from both substrates are connected to each other at the center of the cell, the optical axis of batonnet indicating the layer normal direction during the formation of the layer immediately after the layer transition is suitably used.

The rubbing directions were set to be substantially parallel to each other (thus expressed because of rubbing, see FIG. 12($a$)). If the rubbing directions are set to be antiparallel directions, two kinds of chevron structures having different bent directions are produced (C1, C2), so that the boundary portion of the domain serves as an alignment defect to cause light leakage. On the other hand, if the rubbing directions are set to be substantially parallel directions, only C2 alignment is produced, so that it is possible to remove alignment defects. The gap was set to be in the range of from 1.2 to 2.5 μm according to the birefringence value of the liquid crystal material.

Referring to FIG. 4, the results of studied pretilt angles α will be described below. Alignment layer materials A through D have the same main chain structure. The alignment layer material A has no side chain, and the alignment layer materials B through D are obtained by introducing side chains into the main chain of the alignment layer material A. The proportions of the introduced side chains of the alignment layer materials B, C and D increase in that order. The pretilt angle α measured by a nematic liquid crystal material was varied from about 1 degree to 90 degrees. In alignment layer materials, hydrophobic side chains are generally introduced to decrease the surface free energy, i.e., to increase the pretilt angle.

On the other hand, with respect to alignment layer materials E through H, the alignment layer material G has no side chain, and the alignment layer material H is obtained by introducing side chains into the main chain of the alignment layer material G. The alignment layer material E is obtained by introducing fluorine into the main chain of the alignment layer material G to enhance its polarity, and the alignment layer material F is obtained by introducing side chain having a high polarity. With respect to the alignment layer materials E through H, the pretilt angle α measured by a nematic liquid crystal material was 3 degrees at the maximum and was not greatly changed. With respect to alignment layer materials I through N, it was verified that all of the pretilt angles α were adjusted to be about 1 degree although both of the structures of the main and side chains of these materials were different.

With respect to the materials A through D having the same main chain structure, the polarity force component $\gamma s^P$ of the surface free energy continuously decreased from 14.5 dyn/cm to 10.6 dyn/cm as the proportion of the hydrophobic side chains increased, so that the correlation between the structure and surface free energy of the alignment layer material was observed. Also with respect to the alignment layer materials E through H, the surface free energy similarly varied in accordance with the structure of the alignment layer material. On the other hand, with respect to the alignment layer materials I through N, the polarity force component $\gamma s^P$ greatly varied from 2.8 dyn/cm to 11.4 dyn/cm though the pretilt angle a measured by the nematic material was only changed by about 1 degree. That is, if the main chain structure is different, there is no correlation between the polarity force component $\gamma s^P$ and the pretilt angle.

It was verified that the relationship between the measured polarity force component $\gamma s^P$ of the surface free energy and deterioration ratio has the following tendency (see FIG. 4).

First, with respect to the alignment layer materials A through D, the deterioration ratio increases as the polarity force component $\gamma s^P$ increases (with respect to the alignment layer materials C and D, deterioration ratios were not evaluated since initial alignment characteristics were bad). In order to continuously evaluate the characteristics of the alignment layer materials A through D, alignment layer materials consisting of the alignment layer material B mixed with the alignment layer material C in a proportion of 1:2 or 2:1 were studied, and it was verified that the deterioration ratio continuously varied.

Figure 8:
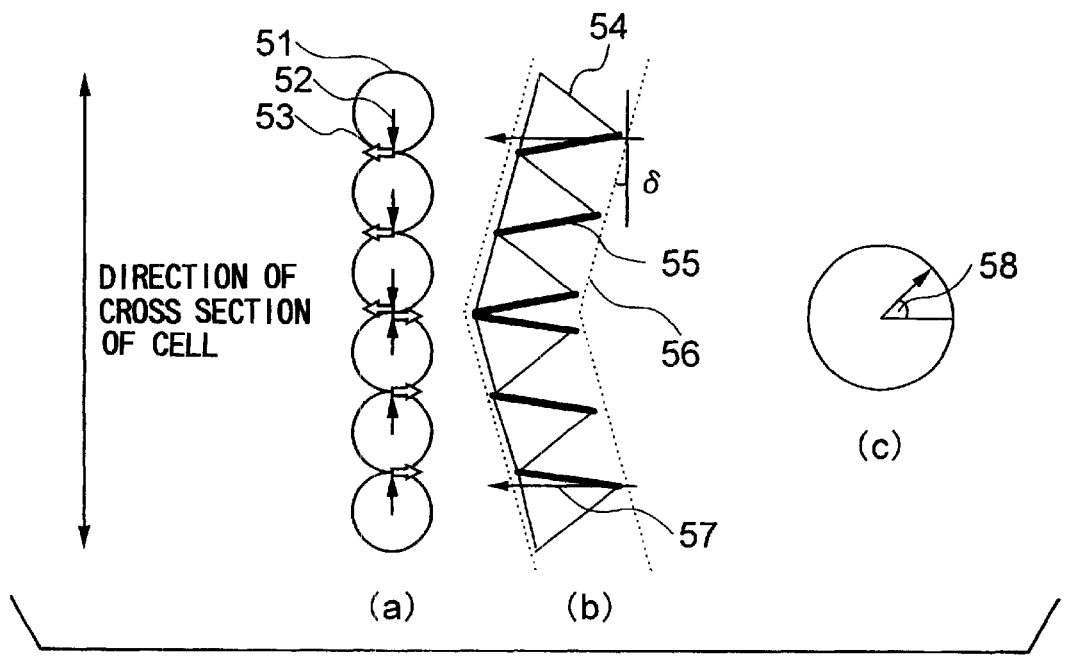
FIG. 8 is an illustration showing a collective model in a cell using a TLAF liquid crystal when no voltage is applied.

In order to the phenomenon that the deterioration ratio deteriorates when the polarity force component $\gamma s^P$ is great, the arrangement of a TLAF liquid crystal material in a panel will be first described referring to FIG. 8. FIG. 8 is a schematic diagram showing a collective orientation (see B. Park et al., Phys. Rev. E, 59(4), R3815 (1999)). FIG. 8(a) is an illustration viewed in a direction parallel to the normal direction of a smectic layer 56, wherein each of circles denotes the orbital (corn) 51 of movement of a liquid crystal molecule, each of black arrows denotes a c director 52, and each of white arrows denotes the direction of a dipole moment 53. Molecules 55 are positioned so that an azimuth angle 58 is 90 degrees or 270 degrees. FIG. 8(b) is an illustration viewed in a direction parallel to the layer direction of the smectic layer 56, wherein each of triangles denotes a corn viewed from the side, each of thick lines denotes the liquid crystal molecule 55, and each of arrows denotes top and bottom alignment layer faces and their rubbing directions. The smectic layer 56 is bent at an angle of δ from the normal direction to the surface of the substrate. FIG. 8(c) is an illustration for explaining the azimuth angle 58. Furthermore, reference number 51 denotes a corn viewed in the layer normal direction, reference number 54 denotes a corn viewed in the layer direction, and reference number 57 denotes a rubbing direction on the surface of the alignment layer.

Figure 9:
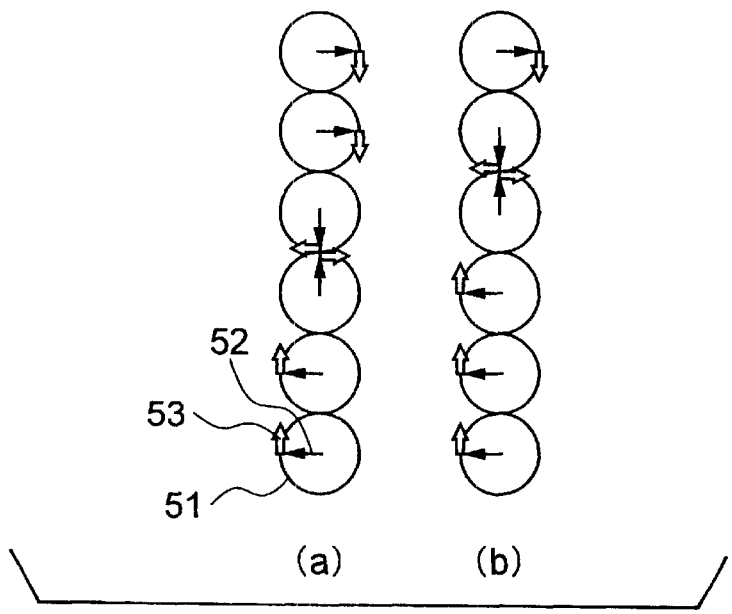
FIG. 9 is an illustration for explaining the instability of alignment due to polarity interaction.

In the collective orientation, liquid crystal molecules are ideally positioned so that the azimuth angle is 90 degrees or 270 degrees. However, in an alignment layer material having a great polarity, a dipole moment wherein the direction of polarization is substantially perpendicular to the long axis of a liquid crystal molecule faces in a direction perpendicular to the surface of the alignment layer. That is, the azimuth angle tends to be 0 degree or 180 degrees, it is considered that the stability of alignment lowers. The fact that the azimuth angle is 0 degree or 180 degrees means that the uniaxial optical anisotropy of the TLAF liquid crystal molecule is shifted from the layer normal direction as shown in FIGS. 9(a) and 9(b). FIG. 9(a) is an illustration showing an example wherein the direction of the dipole moment 53 of molecules in the vicinity of the surface of the alignment layer is perpendicular to the surface of the alignment layer, and the molecules are positioned so that the azimuth angle is 0 degree or 180 degrees, the liquid crystal molecular orientation in the vicinity of the surface of the alignment layer being shifted from the layer normal direction. FIG. 9(b) shows an example wherein the influence of the surface of the alignment layer is not equal, and the number of molecules positioned at 0 degree or 180 degrees is unbalanced, so that the average optical axis is shifted from the molecular layer normal direction.

Figure 10:
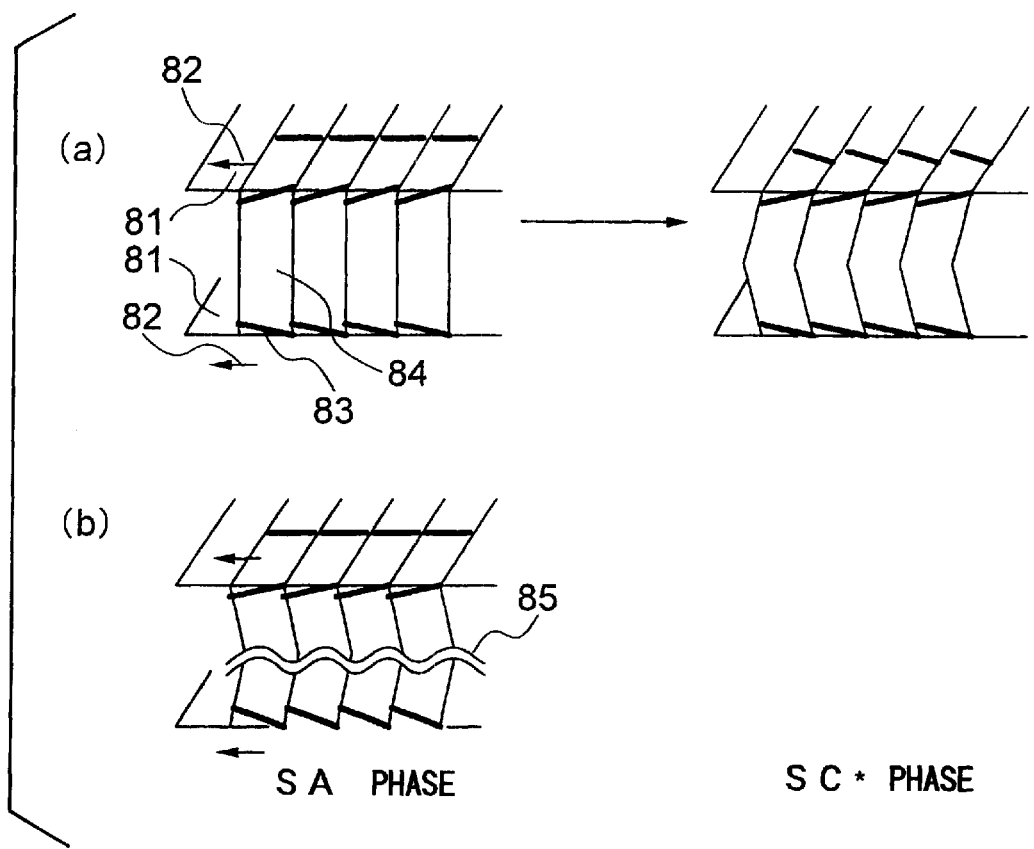
FIGS. 10(a)–(b) are schematic diagram showing a pretilt angle and a smectic layer formed in SA phase.
Figure 11:
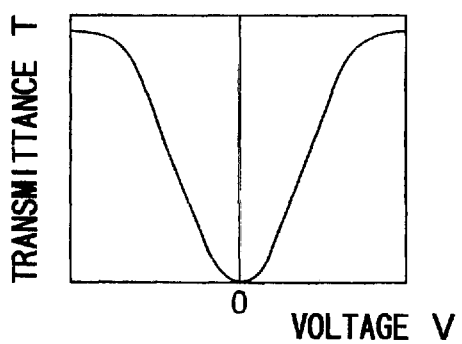
FIG. 11 is a graph showing voltages and transmittance characteristics of a liquid crystal.

On the other hand, with respect to only the alignment film materials A through D wherein the polarity force component $\gamma s^P$ varies in accordance with the proportion of the introduced hydrophobic side chains, the fact that the polarity force component $\gamma s^P$ is small is the same as the fact that the pretilt angle is high. It is known that the long axis of molecules is substantially parallel to the layer normal direction in a process for forming a smectic layer in SA phase (if there is the electro clinic effect, the molecular long-axis direction is shifted from the layer normal direction by a few degrees due to the influence of the effect). FIG. 10 schematically shows a smectic layer which is formed by a pretilt angle and SA phase. FIG. 10(a) shows a case where the pretilt angle is low, and FIG. 10(b) shows a case where the pretilt angle is high. In FIG. 10, reference number 81 denotes the surface of the alignment layer, reference number 82 denoting a rubbing direction, reference number 83 denoting molecules on the surface of the alignment layer, reference number 84 denoting a smectic layer, and reference number 85 denoting the surface of discontinuity of the smectic layer.

Although the smectic layer is formed from the vicinity of the surface of the alignment layer, the smectic layer is not perpendicular to the surface of the alignment layer as shown in FIG. 10(b) when the pretilt angle is high. If the smectic layer induced from the surface of the alignment layer is not perpendicular to the surface of the alignment layer, the smectic layers induced from the surfaces of both of the alignment layers are discontinuous at the center of the panel. As the support of this consideration, the layer normal direction was not defined as one direction in a panel using the alignment layer E, and a fan-shaped texture was observed in a panel using the alignment layer F having the higher pretilt angle. The fan-shaped texture is observed when SC* phase is formed without the application of the aligning force generally in smectic layers.

As described above, in the study of the alignment layer materials A through D, in the case of an alignment layer had a high polarity force component $\gamma s^P$, the polarity interaction with an alignment layer was great, so that the molecular long-axis direction was shifted to increase the deterioration ratio. In the case of an alignment layer having a low polarity force component $\gamma s^P$, the smectic layer induced from the alignment layer was inclined due to the high pretilt angle, so that continuous smectic layers could not be formed in the cross direction of the panel, thereby deteriorating the deterioration ratio.

Since the alignment layer materials A through D have a system wherein the polarity force component $\gamma s^P$ is decreased by introducing hydrophobic side chains, the pretilt angle increases in accordance with the decrease of the polarity force component $\gamma s^P$. On the other hand, when the alignment layer materials E through H wherein the pretilt angle does not so change and the alignment layer materials I through N wherein the pretilt angle is controlled to be 1 through 2 degrees were arranged in order of the polarity force component $\gamma s^P$, the turbulence of the layer normal direction was not observed although the structure have points in common. On the other hand, a tendency to decrease the deteriorate ratio with the decrease of the polarity force component $\gamma s^P$ was observed.

Figure 1:
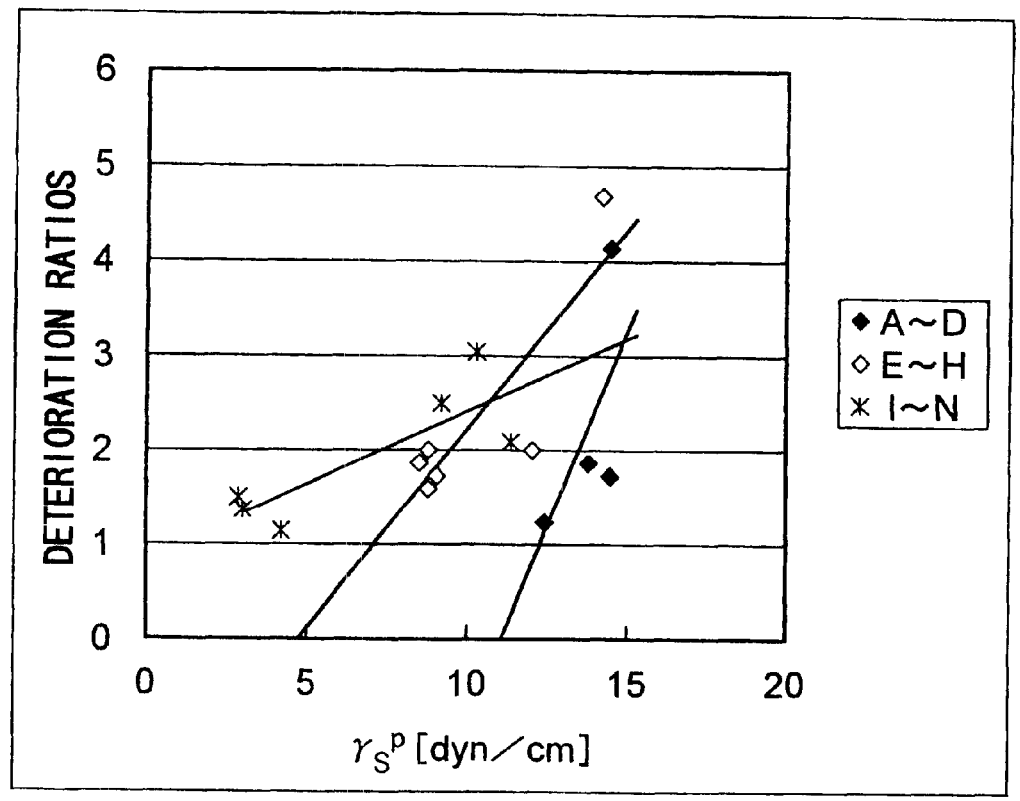
FIG. 1 is a graph showing the dependency of deterioration ratios on the polarity force components $\gamma s^P$ of surface free energies.

In order to verify the above described tendency, the dependency of the deterioration ratio on the polarity force component $\gamma s^P$ observed with respect to the alignment layer materials A through N is shown in FIG. 1. Although the deterioration ratio decreased as the polarity force component $\gamma s^P$ decreases, with respect to the alignment layer materials C and D, the quantity of light leakage in a dark state in the initial alignment was large, so that the deterioration ratio was not evaluated.

On the other hand, after studying the dependency of the alignment characteristics and deterioration ratio on the dispersion force component $\gamma s^d$ observed with respect to the alignment layer materials A through N, it was observed that the deterioration ratio decreased with the increase of the dispersion force component $\gamma s^d$ independently of the system of the materials (see FIG. 2). Although the physical meaning of the dispersion force component $\gamma s^d$ is not so understood, there is an opinion that it means intermolecular interaction (van der Waals force). The results of FIG. 2 show a tendency to be more difficult to deteriorate as the intermolecular interaction is higher.

Finally, with respect to batonnet, the phenomenon $(\theta_B \neq \theta_{BD})$ that the extending direction was not coincident with the optical axis was observed with respect to part of combinations of alignment layers with liquid crystal materials. It is considered that the extending direction of batonnet (the angle shifted from the rubbing direction: $\theta_B$, see FIG. 7) indicates the molecular long-axis direction in the vicinity of the surface of the alignment layer deposited by batonnet. On the other hand, it is considered that the optical axis of batonnet (the angle deviated from the rubbing direction: $\theta_{BD}$, see FIG. 7) indicates the molecular average optional axis (=molecular long-axis direction) in a cell (bulk). That is, $\theta_B \neq \theta_{BD}$ means that the molecular orientation is twisted in the cross-sectional direction of the cell. The smectic layer normal direction in SC* phase in a lower temperature region is coincident with the optical axis of batonnet, and the layer structure of SA phase is also maintained in SC* phase, so that it can be seen that the layer normal direction in SA phase is coincident with the optical axis. Although such a twist of molecular orientation in the vicinity of the interface is described as the electro clinic effect (W. Chen et al., Phys. Rev. Lett., 68(19)1547 (1992)). The phenomenon that the extending direction and optical axis of batonnet were shifted from each other was newly observed. That is, when the electro clinic effect is very large and if the molecular orientation is twisted to a region spaced from the surface of the alignment layer, it is considered that the extending direction and optical axis of batonnet are shifted from each other. As compared with the definition of SA phase (layer normal direction=molecular long–axis direction), there is some possibility that the layer may be twisted. Also in view of the collective model (see FIG. 8) described in the paragraph with respect to the surface free energy, the same results as the consideration of the phenomenon that the alignment stability deteriorates (the molecular orientation is twisted in the vicinity of the alignment layer) were obtained when the polarity force component $\gamma s^P$ of the surface free energy was great. Also by the fact that the shift between the extending direction and optical axis of batonnet was particularly conspicuous in the alignment layer A having the high surface free energy, it can be described that the molecular orientation was twisted in the vicinity of the surface of the alignment layer by the combination in which the electric interaction was great.

Also as described in the paragraph with respect to the samples for measuring the alignment characteristics and deterioration ratios, the layer normal directions to smectic layers induced from the surface of the alignment layers on both substrates must be coincident with each other in order to form uniform smectic layers. That is, it is necessary to carry out a cross rubbing for shifting (by $2\theta_{BD}$ in total) in a direction in which $\theta_{BD}$ indicating the layer normal direction of bulk, not $\theta_B$ indicating the molecular long-axis direction in the vicinity of the alignment layer, is canceled.

With respect to the alignment layer materials C and D, good alignment was not obtained though the optical axis and extending direction of batonnet were coincident with each other. This has been described in detail in the consideration of the surface free energy.

From the above described results, in order to select a liquid crystal element having a deterioration ratio of 2 or less while maintaining alignment characteristics as a preferred liquid crystal element, it is required to use an alignment layer wherein the pretilt angle measured using a nematic liquid crystal material (ZLI-2293 or ZLI-2003, ZLI-1565; produced by Merch Co., Ltd.) is less than 6 degrees and the polarity force component $\gamma s^P$ of the surface free energy is 13 dyn/cm or less, in a combination of a liquid crystal material with the alignment layer wherein the extending direction and optical axis of batonnet are coincident with each other.

Moreover, if the polarity force component $\gamma s^P$ of the surface free energy is 9 dyn/cm or less, accuracy is higher. On the other hand, it is required to use an alignment layer wherein the dispersion force component $\gamma s^d$ of the surface free energy is 38 dyn/cm or more. Moreover, if the dispersion force component of the surface free energy is 42 dyn/cm or more, accuracy is higher. Furthermore, the reason why the liquid crystal element preferably has a deterioration ratio of 2 or less is as follows.

The contrast (=transmittance in a bright state/transmittance in a dark state) of a liquid crystal display element using a twisted nematic (TN) liquid crystal is generally in the range of from about 200 to about 300, and about 250 on average, although it varies in accordance with measuring methods. In liquid crystal display elements using liquid crystals having a birefringence mode, which includes TLAF liquid crystals, the quantity I of transmitted light is in proportion to $\sin^2(2\theta)$ assuming that the tilt angle is $\theta$. The tilt angle $\theta$ of the TLAF liquid crystal is about 30 degrees. Therefore, in the TLFA liquid crystal, the quantity of transmitted light is about 75% of an ideal value (when $\theta$=45 degrees). That is, the contrast of the TLAF liquid crystal is about 75% (=about 180) of the contrast of a TN liquid crystal. Because the inventors considered that the contrast of 100 or less is insufficient for transmission display elements and that it is not allowed that the quantity of transmitted light during black display exceeds double, i.e., the deteriorate ratio exceeds 2.

From the above described study, it was found that it was possible to optimize an alignment layer on the basis of a polarity force component $\gamma s^P$ or a dispersion force component $\gamma s^d$ when an alignment layer for a smectic liquid crystal indicating optical response characteristics having no hysteresis, such as a TLAF liquid crystal, was selected. That is, alignment layers satisfying the following conditions are optimum as alignment layers for TLAF liquid crystal.
1) The shifted angle between the extending direction and optical axis of batonnet is 1 degree or less.
2) Low $\gamma s^P$ ($\gamma s^P$<13 dyn/cm, more preferably $\gamma s^P$<9 dyn/cm)
3) High $\gamma s^d$ ($\gamma s^d$>38 dyn/cm, more preferably $\gamma s^d$>42 dyn/cm)
4) Low pretilt angle ($\alpha$<6 degrees)

If a liquid crystal material and alignment layer meeting these conditions are used and if top and bottom substrates are combined to prepare a panel so that the optical axis of a batonnet deposited from the top substrate is coincident with the optical axis of a batonnet deposited from the bottom substrate, it is possible to realize a TLAF liquid crystal display element having excellent alignment characteristics.

(First Embodiment)

The first embodiment of a liquid crystal display element according to the present invention will be described below.

In this embodiment, a liquid crystal display element is an active matrix liquid crystal display (AMLCD) element using a light modulating layer of a TLAF liquid crystal material, and the construction thereof will be described referring to FIGS. 5(a) and 5(b).

FIG. 5(a) is a plan view of the active matrix liquid crystal display (AMLCD) element in this embodiment, and FIG. 5(b) is a sectional view taken along line A–A' of FIG. 5(a). As shown in FIGS. 5(a) and 5(b), the liquid crystal display element in this embodiment comprises an array substrate 10, a counter substrate 30, and a light modulating layer 40 which is sandwiched between the substrates so as to have a predetermined thickness by ribs 45 and which is made of an anti-ferroelectric liquid crystal material having a thresholdless voltage-transmittance characteristic. The array substrate 10 has a transparent insulating substrate 11. On the major surface of the substrate 11, a plurality of scanning lines 12 and storage capacitor lines 13 extending in one direction are formed. In addition, a transparent insulating layer 14 is formed on the major surface of the substrate 11 so as to cover the scanning lines 12 and the storage capacitor lines 13 (see FIG. 5(b). On the insulating layer 14, a plurality of pixel electrodes 15 of ITO are formed, and a plurality of signal lines 16 are formed so as to be substantially perpendicular to the scanning lines 12 (see FIGS. 5(a) and 5(b)). The signal lines 16 are covered with an insulating film 17 (see FIG. 5(b)). On the major surface of the substrate 11 near each of the intersections between the scanning lines 12 and the signal lines 16, a switching element 18 of TFT is formed. The gate of the switching element 18 is connected to a corresponding one of the scanning lines 12. One terminal of the source and drain of the switching element 18 is connected to a corresponding one of the signal lines 16 via a contact (not shown) provided in the insulating film 17, and the other terminal is connected to a corresponding one of the pixel electrodes 15.

On the major surface of the substrate 11, an alignment layer 19 is formed so as to cover the pixel electrodes 15 and the switching elements 18. On the reverse surface of the substrate 11, a polarizing plate 28 is formed.

On the other hand, the counter substrate 30 is provided with a color filter part 32 which comprises a color part 32a, formed in a pixel region on the major surface of a transparent insulating substrate 31, for allowing light having specific wavelengths to pass therethrough, and a black matrix 32b formed in a non pixel region. On the display region of the color filter part 32, a counter electrode 34 of ITO is formed. On the counter electrode 34, an alignment layer 36 is formed via an inorganic insulating film 35. Furthermore, the inorganic insulating film 35 is preferably provided for maintaining insulation. On the display surface of the substrate 31, a polarizing plate 38 is formed.

In this embodiment, the alignment layers 19 and 36 are formed of the alignment layer material G shown in FIG. 4 so as to have a thickness of 43 nm. The alignment layer material G had a pretilt angle of 1 to 2 degrees which was measured by a nematic liquid crystal material ZLI-2293, ZLI-2003 or ZLI-1565 (produced by Merck Co., Ltd.). The alignment layers 19 and 36 have been cross-rubbed in a direction, which is substantially parallel to a direction shifted from the normal direction to a smectic layer constituting the light modulating layer 40 in a plus direction by 3.0 degrees, toward the surface of each of the alignment layers so as to cancel $\theta_{BD}$ (=−3.0 degrees) (a cross rubbing shifted in the same direction as that in FIG. 12(a)). Furthermore, after the rubbing, the polarity force component $\gamma s^P$ of the surface free energy of the alignment layers 19 and 36 was 9.0 dyn/cm, and the dispersion force component $\gamma s^d$ thereof was 42.1 dyn/cm.

The panel alignment of the array substrate 10 with the counter substrate 30 is carried out by a sealing material, which is applied on the non-display region, so that the alignment layers 19 and 36 face each other, except for an injection port (not shown) and an exhaust port (not shown). The distance between the substrate 10 and the substrate 30 in the opening portion is maintained so as to be 1.75 μm by means of the ribs 45. Although the ribs 45 may be formed on the top face of the alignment layer, the ribs are preferably formed on the bottom face of the alignment layer from the standpoint of alignment characteristics. In this embodiment, the TLAF liquid crystal material a shown in FIG. 3 was used as the liquid crystal material constituting the light modulating layer 40.

This liquid crystal material is introduced after an injection process in which the liquid crystal material is introduced from the injection port while exhausting from the exhaust port. After the liquid crystal material is injected, the injection port and the exhaust port are completely sealed by a closing material (not shown) to be insulated from outside air. After the panel filled with the liquid crystal material a was heated once to 100° C., it was cooled slowly at a temperature rising rate of −1° C./min to 30° C. As a result, the optical axis of a batonnet deposited from the surface of each of the alignment layers at near the Iso/SA phase transition temperature is substantially coincident with each other in the substantially intermediate between the above described rubbing directions, and a uniform smectic layer structure having a layer normal direction coincident with the optical axis was formed in SC* layer. Furthermore, the polarizing direction of one of the polarizing plates 28 and 38 arranged in the crossed polarizers configuration is arranged so as to be coincident with the layer normal direction.

After the alignment state of this liquid crystal display element was observed, it was revealed that the alignment state was C2 alignment, except for a very small amount of alignment defects produced in the vicinity of the ribs, from the shape of the alignment defects and the rubbing directions, and that the optical axis was coincident with the layer normal direction. The contrast of the liquid crystal display element, i.e., the ratio of the maximum light transmission to the minimum light transmission (maximum light transmission/minimum light transmission), was about 200, so that a sufficient contrast was achieved. In addition, even after a reliability test, the contrast was maintained to be 100 or higher.

(Second Embodiment)

A panel of a liquid crystal display element was prepared in the same manner as that in the first embodiment, except that the alignment layers 19 and 36 were formed of the alignment layer material L shown in FIG. 4 so as to have a thickness of 42 nm and that the alignment layers 19 and 36 were cross-rubbed in substantially parallel directions shifted from the normal direction of the smectic layer constituting the light modulating layer 40 in the plus direction by 5.0 degrees toward the surfaces of the alignment layers, respectively, and a liquid crystal display element filled with the TLAF liquid crystal material a shown in FIG. 3 was prepared. This alignment layer material A had a pretilt angle of 1.0 degree measured by a nematic liquid crystal material ZLI-2293 (produced by Merck Co., Ltd.). In this embodiment, the polarity force component $\gamma s^P$ of the surface free energy of the alignment layers 19 and 36 after the rubbing was 4.3 dyn/cm, and the dispersion force component $\gamma s^d$ thereof was 43.1 dyn/cm.

After the liquid crystal display element in this embodiment was heated once to 100° C. at which Iso phase was formed, it was cooled slowly at a temperature rising rate of −1° C./min to 30° C. As a result, a smectic layer structure was obtained wherein the layer normal direction in SC* phase was substantially intermediate between the rubbing directions of both substrates. In addition, from the shape of a very small amount of alignment defects produced in the vicinity of the ribs and the rubbing directions, it was revealed that the alignment state was C2 alignment, except for the alignment defect portions. The contrast of this liquid crystal display element was about 200, so that a sufficient contrast was achieved. In addition, even after a reliability test, the contrast was maintained to be 100 or higher.

COMPARATIVE EXAMPLE 1

A panel of a liquid crystal display element was prepared in the same manner as that in the embodiments, except that the alignment layers 19 and 36 were formed of the alignment layer material A shown in FIG. 4 so as to have a thickness of 38 nm and that the alignment layers 19 and 36 were cross-rubbed in substantially parallel directions shifted from the normal direction of the smectic layer constituting the light modulating layer 40 in the minus direction by 7.0 degrees toward the surfaces of the alignment layers, respectively, and a liquid crystal display element filled with the TLAF liquid crystal material a shown in FIG. 3 was prepared. Although the rubbing direction was obtained from the optical axis (7.0 degrees) of batonnet, it was not coincident with the extending direction (1.0 degree) of batonnet. In addition, the alignment layer material A had a pretilt angle of 1 to 3 degrees measured by a nematic liquid crystal material ZLI-2293, ZLI-2003 or ZLI-1565 (produced by Merck Co., Ltd.). In this comparative example 1, the polarity force component $\gamma s^P$ of the surface free energy of the alignment layers 19 and 36 after the rubbing was 14.5 dyn/cm, and the dispersion force component $\gamma s^d$ thereof was 38.9 dyn/cm.

After the liquid crystal display element in this comparative example 1 was heated once to 100° C. at which Iso phase was formed, it was cooled slowly at a temperature rising rate of −1° C./min to 30° C. As a result, a smectic layer structure was obtained wherein the layer normal direction in SC* phase was substantially intermediate between the rubbing directions of both substrates. In addition, from the shape of a very small amount of alignment defects produced in the vicinity of the ribs and the rubbing directions, it was revealed that the alignment state was C2 alignment, except for the alignment defect portions. However, it was observed that domains having a optical axis shifted from the layer normal direction by ±18 degrees were conspicuously produced.

The initial value of the contrast of this liquid crystal display element was 80 or less since the domains having an optical axis deviated from the transmission axis of the polarizing plate were produced.

COMPARATIVE EXAMPLE 2

A panel of a liquid crystal display element was prepared in the same manner as that in the embodiments, except that the alignment layers 19 and 36 were formed of the alignment layer material E shown in FIG. 4 so as to have a thickness of 41 nm and that the alignment layers 19 and 36 were cross-rubbed in substantially parallel directions shifted from the normal direction of the smectic layer constituting the light modulating layer 40 in the plus direction by 5.0 degrees toward the surfaces of the alignment layers, respectively, and a liquid crystal display element filled with the TLAF liquid crystal material a shown in FIG. 3 was prepared. This alignment layer material E had a pretilt angle of 1 to 3 degrees measured by a nematic liquid crystal material ZLI-2293, ZLI-2003 or ZLI-1565 (produced by Merck Co., Ltd.). In this comparative example 2, the polarity force component $\gamma s^P$ of the surface free energy of the alignment layers 19 and 36 after the rubbing was 14.2 dyn/cm, and the dispersion force component $\gamma s^d$ thereof was 33.6 dyn/cm.

After the liquid crystal display element in this comparative example 2 was heated once to 100° C. at which Iso phase was formed, it was cooled slowly at a temperature rising rate of −1° C./min to 30° C. As a result, a smectic layer structure was obtained wherein the layer normal direction in SC* phase was substantially intermediate between the rubbing directions of both substrates. In addition, from the shape of a very small amount of alignment defects produced in the vicinity of the ribs and the rubbing directions, it was revealed that the alignment state was C2 alignment, except for the alignment defect portions. However, after the alignment state of this panel was observed after a reliability rest, domains having an optical axis deviated from the layer normal direction by ±14 degrees were produced.

Although the initial value of the contrast of this liquid crystal display element reached to about 200, the black level was increased by the production of the domains having the optical axis deviated from the transmission axis of the polarizing plate, so that the contrast was lowered to 50 or less after the reliability test.

COMPARATIVE EXAMPLE 3

Although a process for depositing batonnet was observed in order to obtain the rubbing direction with respect to the alignment layers 19 and 36 formed of the alignment layer material D shown in FIG. 4, the optical axis and the extending direction were not determined. This alignment layer material D had a pretilt angle of about 90 degrees measured by a nematic liquid crystal material ZLI-2293, ZLI-2003 or ZLI-1565 (produced by Merck Co., Ltd.). In addition, the polarity force component $\gamma s^P$ of the surface free energy of the alignment layers 19 and 36 after the rubbing was 10.6 dyn/cm, and the dispersion force component $\gamma s^d$ thereof was 37.9 dyn/cm.

Therefore, a one-side rubbing was carried out, and the liquid crystal material a shown in FIG. 3 was used for carrying out the same slow cooling process as those in the embodiments and the comparative example 1 to prepare a panel. After the alignment state at that time was observed, a fan-shaped structure was observed, and the contrast was one digit or less.

As described above, according to the present invention, it is possible to obtain a liquid crystal display element having a good display performance which is not influenced by the deterioration with the time course and the history of applied voltage.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A liquid crystal display element comprising:
   a first electrode substrate having a first transparent substrate, a first electrode formed on said first substrate, and a first alignment layer formed on said first substrate;
   a second electrode sub rate having a second transparent substrate, a second electrode formed on said second substrate, and a second alignment layer formed on said second substrate; and
   a light modulating layer of a smectic liquid crystal material which is sandwiched between said first and second electrode substrates and which has a thresholdless voltage-transmittance characteristic an a spontaneous polarization of 120 nC/cm² or less,
   a polarity force component of the surface free energy of each of said first and second alignment layers being 13 dyn/cm or less.

2. A liquid crystal display element as set forth in claim 1, wherein a pretilt angle measured by a nematic liquid crystal with respect to said first and second alignment layers is less than 6 degrees.

3. A liquid crystal display element as set forth in claim 1, wherein the polarity force component of the surface free energy of each of said first and second alignment layers is 9 dyn/cm or less.

4. A liquid crystal display element as set forth in claim 3, wherein a pretilt angle measured by a nematic liquid crystal with respect to said first and second alignment layers is less than 6 degrees.

5. A liquid crystal display element comprising:

a first electrode substrate having a first transparent substrate, a first electrode formed on said first substrate, and a first alignment layer formed on said first substrate;

a second electrode sub rate having a second transparent substrate, a second electrode formed on said second substrate, and a second alignment layer formed on said second substrate; and a light modulating layer of a smectic liquid crystal material which is sandwiched between said first and second electrode substrates and which has a thresholdless voltage-transmittance characteristic an a spontaneous polarization of 120 $nC/cm^2$ or less, a dispersion force component of the surface free energy of each of said first and second alignment layers being 38 dyn/cm or more.

6. A liquid crystal display element as set forth in claim 5, wherein a pretilt angle measured by a nematic liquid crystal with respect to said first and second alignment layers is less than 6 degrees.

7. A liquid crystal display element as set forth in claim 5, wherein the dispersion force component of the surface free energy of each of said first and second alignment layers is 42 dyn/cm or more.

8. A liquid crystal display element as set forth in claim 7, wherein a pretilt angle measured by a nematic liquid crystal with respect to said first and second alignment layers is le s than 6 degrees.

* * * * *